US012126699B2

(12) United States Patent
Cai et al.

(10) Patent No.: US 12,126,699 B2
(45) Date of Patent: Oct. 22, 2024

(54) SUPERPOSITION-BASED CONTENT SERVING

(71) Applicant: Microsoft Technology Licensing, LLC, Redmond, WA (US)

(72) Inventors: Tao Cai, Sunnyvale, CA (US); Albert Hwang, McKinney, TX (US); Jianlong Zhang, Sunnyvale, CA (US); Muhammad Hassan Khan, Dublin, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/972,408

(22) Filed: Oct. 24, 2022

(65) Prior Publication Data

US 2024/0137427 A1    Apr. 25, 2024

(51) Int. Cl.
| G06F 3/00 | (2006.01) |
| G06F 13/00 | (2006.01) |
| H04L 67/306 | (2022.01) |
| H04L 67/50 | (2022.01) |
| H04L 67/63 | (2022.01) |
| H04N 5/445 | (2011.01) |

(52) U.S. Cl.
CPC ............ *H04L 67/63* (2022.05); *H04L 67/306* (2013.01); *H04L 67/535* (2022.05)

(58) Field of Classification Search
CPC ...... H04L 67/63; H04L 67/306; H04L 67/535
See application file for complete search history.

(56) References Cited

U.S. PATENT DOCUMENTS

| 10,952,014 | B2* | 3/2021 | Yang ................. G06Q 30/0639 |
| 11,968,185 | B2 | 4/2024 | Lebedev et al. | |
| 11,968,236 | B2 | 4/2024 | Rogers et al. | |
| 2010/0094758 | A1* | 4/2010 | Chamberlain ... G06Q 10/06375 |
| | | | 705/50 |
| 2015/0287113 | A1* | 10/2015 | Dearing ............. G06Q 30/0611 |
| | | | 705/26.4 |
| 2017/0371925 | A1* | 12/2017 | Arya ................. G06F 16/24534 |
| 2022/0303761 | A1 | 9/2022 | Mohan | |

(Continued)

OTHER PUBLICATIONS

"Latanya Sweeney—Wikipedia", Retrieved From: https://web.archive.org/web/20210413202508/https://en.wikipedia.org/wiki/Latanya_Sweeney, Apr. 13, 2021, 3 Pages.

(Continued)

*Primary Examiner* — Gigi L Dubasky
(74) *Attorney, Agent, or Firm* — NICHOLSON DE VOS WEBSTER & ELLIOTT LLP

(57) ABSTRACT

Embodiments of the disclosed technologies receive a request including a user identifier and metadata associated with a slot available at a user system, remove the user identifier from the request to produce anonymized request data, receive, from a machine learning model, superposition data that correlates with the anonymized request data, send the superposition data for the anonymized request data to a real-time content-to-request matching process, receive, from the real-time content-to-request matching process, an identifier that identifies a content distribution selected based on the superposition data, and initiate the selected content distribution through the network to the slot in response to the request.

18 Claims, 6 Drawing Sheets

(56) References Cited

U.S. PATENT DOCUMENTS

| | | | |
|---|---|---|---|
| 2022/0318830 A1 | 10/2022 | Liu | |
| 2022/0366299 A1* | 11/2022 | Sinha | H04L 67/535 |
| 2023/0014953 A1* | 1/2023 | Makarenko | G06F 9/547 |
| 2023/0123539 A1 | 4/2023 | Paulsen | |
| 2023/0239134 A1 | 7/2023 | Salomon | |
| 2023/0269411 A1 | 8/2023 | Senokuchi | |
| 2023/0275876 A1 | 8/2023 | Lebedev et al. | |
| 2023/0297857 A1 | 9/2023 | Melamed | |
| 2023/0306473 A1 | 9/2023 | Wang | |
| 2023/0315818 A1 | 10/2023 | Gould | |
| 2023/0319110 A1 | 10/2023 | Rogers et al. | |
| 2023/0334021 A1 | 10/2023 | Brechbuhl | |
| 2023/0351464 A1 | 11/2023 | Beausoleil | |

OTHER PUBLICATIONS

"Objective-Collapse Theory", Retrieved from: https://web.archive.org/web/20220407194925/https://en.wikipedia.org/wiki/Objective-collapse_theory, Feb. 23, 2022, 9 Pages.

"Superposition Principle", Retrieved from: https://web.archive.org/web/20220417011530/https://en.wikipedia.org/wiki/Superposition_principle, Mar. 11, 2022, 8 Pages.

Bun, et al., "Concentrated Differential Privacy: Simplifications, Extensions, and Lower Bounds", In Proceedings of 14th International Conference on Theory of Cryptography (TCC), Nov. 1, 2016, pp. 635-658.

Bun, et al., "Simultaneous Private Learning of Multiple Concepts", In Proceedings of 7th ACM Conference on Innovations in Theoretical Computer Science (ITCS), Jan. 14, 2016, pp. 369-380.

Canonne, et al., "The Discrete Gaussian for Differential Privacy", In Journal of Advances in Neural Information Processing Systems, vol. 33, Dec. 6, 2020, 13 Pages.

Cardoso, et al., "Differentially Private Histograms under Continual Observation: Streaming Selection into the Unknown", In Repository of arXiv:2103.16787v2, Jan. 4, 2022, 35 Pages.

Cardoso, et al., "Differentially Private Online Submodular Minimization", In Proceedings of the 22nd International Conference on Artificial Intelligence and Statistics, Apr. 16, 2019, 9 Pages.

Cesar, et al., "Bounding, Concentrating, and Truncating: Unifying Privacy Loss Composition for Data Analytics", In Proceedings of the 32nd International Conference on Algorithmic Learning Theory, Mar. 16, 2021, 38 Pages.

Chan, et al., "Differentially Private Continual Monitoring of Heavy Hitters from Distributed Streams", In Proceedings of 12th International Symposium on Privacy Enhancing Technologies Symposium (PETS), Jul. 11, 2012, pp. 140-159.

Chan, et al., "Private and Continual Release of Statistics", In Journal of ACM Transactions on Information and System Security (TISSEC), vol. 14, No. 3, Article 26, Nov. 1, 2011, 24 Pages.

Durfee, et al., "Practical Differentially Private Top-k Selection with Pay-what-you-get Composition", In Repository of arXiv:1905.04273v2, Sep. 18, 2019, 47 Pages.

Dwork, et al., "Calibrating Noise to Sensitivity in Private Data Analysis", In Proceedings of the Third Conference on Theory of Cryptography, Mar. 4, 2006, pp. 265-284.

Dwork, et al., "Differential Privacy Under Continual Observation", In Proceedings of the Forty-Second ACM Symposium on Theory of Computing, Jun. 5, 2010, pp. 715-724.

Dwork, et al., "On the Complexity of Differentially Private Data Release: Efficient Algorithms and Hardness Results", In Proceedings of the Forty-First Annual ACM Symposium on Theory of Computing, May 31, 2009, pp. 381-390.

Dwork, et al., "Our Data, Ourselves: Privacy Via Distributed Noise Generation", In Proceedings of Annual International Conference on the Theory and Applications of Cryptographic Techniques, May 28, 2006, pp. 486-503.

Dwork, et al., "Pan-Private Streaming Algorithms", In Proceedings of Innovations in Computer Science (ICS), Jan. 5, 2010, pp. 66-80.

Dwork, et al., "The Algorithmic Foundations of Differential Privacy", In Journal Foundations and Trends in Theoretical Computer Science, vol. 9, Issue 3-4, Aug. 11, 2014, 281 Pages.

Hisu, et al., "Private Matchings and Allocations", In Proceedings of the Forty-Sixth annual ACM Symposium on Theory of Computing, May 31, 2014, pp. 21-30.

Jain, et al., "The Price of Differential Privacy under Continual Observation", In Repository of arXiv:2112.00828v2, Dec. 8, 2021, 28 Pages.

Johnson, et al., "FBPCF (Facebook Private Computation Framework)", Retrieved From: https://github.com/facebookresearch/fbpcf?fbclid=IwAR18czH0YDeyS3qdJBUMzT38KMAIGSXUL4elwqWiQZv2Ub9FtAZI7zlogk8, Retrieved Date: Jan. 10, 2022, 11 Pages.

Kifer, et al., "Guidelines for Implementing and Auditing Differentially Private Systems", In Repository of arXiv:2002.04049v2, May 12, 2020, 32 Pages.

Korolova, et al., "Releasing Search Queries and Clicks Privately", In Proceedings of the 18th International Conference on World Wide Web (WWW), Apr. 20, 2009, pp. 171-180.

Lyu, et al., "Understanding the Sparse Vector Technique for Differential Privacy", In Proceedings of the VLDB Endowment, vol. 10, No. 6, Feb. 1, 2017, pp. 637-648.

McSherry, et al., "Mechanism Design via Differential Privacy", In Proceedings of 48th Annual IEEE Symposium on Foundations of Computer Science, Oct. 21, 2007, 10 Pages.

Mir, et al., "Pan-Private Algorithms Via Statistics on Sketches", In Proceedings of the thirtieth ACM SIGMOD-SIGACT-SIGART Symposium on Principles of Database Systems, Jun. 13, 2011, pp. 37-48.

Mudd, Graham, "Privacy-Enhancing Technologies and Building for the Future", Retrieved from: https://www.facebook.com/business/news/building-for-the-future, Aug. 11, 2021, 7 Pages.

Qardaji, et al., "Understanding Hierarchical Methods for Differentially Private Histograms", In Proceedings of the VLDB Endowment, vol. 6, Issue 14, Sep. 1, 2013, pp. 1954-1965.

Rogers, et al., "A Members First Approach to Enabling LinkedIn's Labor Market Insights at Scale", In Repository of arXiv:2010.13981v1, Oct. 27, 2020, 8 Pages.

Rogers, et al., "Asymptotically Truthful Equilibrium Selection in Large Congestion Games", In Proceedings of the Fifteenth ACM Conference on Economics and Computation, Jun. 8, 2014, pp. 771-782.

Rogers, et al., "LinkedIn's Audience Engagements API: A Privacy Preserving Data Analytics System at Scale", In Repository of arXiv:2002.05839v3, Nov. 16, 2020, 28 Pages.

Smith, et al., "(Nearly) Optimal Algorithms for Private Online Learning in Full-information and Bandit Settings", In Proceedings of Advances in Neural Information Processing Systems, vol. 26, Dec. 5, 2013, 9 Pages.

Vadhan, Salil, "The Complexity of Differential Privacy", In Book of Tutorials on the Foundations of Cryptography, 2017, pp. 347-450.

Wilson, et al., "Differentially Private SQL with Bounded User Contribution", In Proceedings on Privacy Enhancing Technologies vol. 2020, No. 2, May 8, 2020, pp. 230-250.

U.S. Appl. No. 17/709,318, filed Mar. 30, 2022.

U.S. Appl. No. 17/681,343, filed Feb. 25, 2022.

Notice of Allowance mailed on Feb. 23, 2024, in U.S. Appl. No. 17/681,343, 10 pages.

Notice of Allowance mailed on Feb. 28, 2024, in U.S. Appl. No. 17/709,318, 03 pages.

Kenthapadi, et al., "PriPeARL: A Framework for Privacy-Preserving Analytics and Reporting at LinkedIn", arXiv:1809.07754v1, Sep. 20, 2018, 10 pages.

Notice of Allowance mailed on Feb. 14, 2024, in U.S. Appl. No. 17/709,318, 16 pages.

Kedacic, et al., "Application for Testing of Video and Subtitle Synchronization", IEEE, 2018, pp. 23-27.

Notice of Allowance mailed on Jan. 25, 2024, in U.S. Appl. No. 17/681,343, 11 pages.

Schneider, et al., "The Use of Social News Curation to Empower Citizens and Journalists: Findings of a Focus Group Study with Professional Curators", IEEE, 2021, pp. 1184-1190.

(56) References Cited

OTHER PUBLICATIONS

Bafna, et al., "The Price of Selection in Differential Privacy", In Proceedings of the 30th Conference on Learning Theory, PMLR, Jul. 7, 2017, 18 Pages.

Bassily, et al., "Local, private, efficient protocols for succinct histrograms", In Proceedings of the 47th ACM Symposium on Theory of Computing, June. 14, 2015, pp. 127-135.

Bassily, et al., "Practical Locally Private Heavy Hitters", In Proceedings of Advances in Neural Information Processing Systems, vol. 30, Dec. 4, 2017, 9 Pages.

Bhaskar, et al., "Discovering Frequent Patterns in Sensitive Data", In Proceedings of the 16th ACM SIGKDD International Conference on Knowledge Discovery and Data Mining, Jul. 25, 2010, pp. 503-512.

Dajani, et al., "The modernization of statistical disclosure limitation at the US Census Bereau", Retrieved From: https://www2.census.gov/cac/meetings/2017-09/statistical-disclosure-limitation.pdf, Sep. 2017, 12 Pages, Ding, et al., "Collecting Telemetry Data Privately", In Proceedings of the Conference on Neural Information Processing Systems, vol. 30, Dec. 5, 2017, 10 Pages.

Durand, et al., "Loglog Counting of Large Cardinalities", In Proceedings of European Symposium on Algorithms, Sep. 16, 2003, pp. 605-617.

Dwork, et al. "Boosting and Differential Privacy", In Proceedings of the IEEE 51st Annual Symposium on Foundations of Computer Science, Oct. 26, 2010, pp. 51-60.

Dwork, et al., "Concentrated Differential Privacy", In Repository of arXiv:160.01887v2, Mar. 16, 2016, 28 Pages.

Dwork, et al., "Differentially Private False Discovery Rate Control", In Repository of arXiv:1807.01209v1, Jul. 11, 2018, 43 Pages.

Dwork, et al., "Provate False Discovery Rate Control Rate Control", In Repository of arXiv:1511.03803v1, Nov. 12, 2015, 23 Pages.

Erlingsson, et al., "Rappor: Randomized Aggregatable Privacy-Preserving Ordinal Response", In Proceedings of the ACM SIGSAC Conference on Computer and Communications Security, Nov. 3, 2014, pp. 1054-1067.

Fanti, et al., "Building a Rappor with the unknown: Privacy-preserving learning of associations and data dictionaries", In Proceedings of the Privacy Enhancing Technoologies, vol. 3, Jul. 1, 2016, pp. 41-61.

Ilyas et al., "A Survey of Top-k Query Processing Techniques in Relational Database Systems", In Journal of ACM Computing Surveys, vol. 40, Issue 4, Oct. 1, 2008, Oct. 1, 2008, 58 Pages.

Johnson, et al., "Towards Practical Differential Privacy for SQL Queries", In Proceedings of the VLDB Endowment, vol. 11, No. 5, Jan. 1, 2018, pp. 526-539.

Kairouz, et al., "The Composition Theorem for Differential Privacy", In Proceedings of IEEE Transactions on Information Theory, vol. 63, Issue 6, Jun. 2015, pp. 4037-4049.

Kantarcioolu, et al., "When do Data Mining Results Violate Privacy?", in Proceedings of the Tenth ACM SIGKDD International Conference on Knowledge Discovery and Data Mining, Aug. 22, 2004, pp. 599-604.

"Learning with Privacy at Scale", Retrieved From: https://machinelearning.apple.com/research/learning-with-privacy-at-scale, Dec. 2017, 25 Pages.

Lee, et al., "Top-k Frequent Itemsets via Differentially Private FP-Trees", Proceedings of the 20th ACM SIGKDD International Conference on Knowledge Discovery and Data Mining, Aug. 24, 2014, pp. 931-940

Li, et al., "PrivBasis: Frequent Itemset Mining with Differential Privacy", In Proceedings of the VLDB Endowment, vol. 5, No. 11, Aug. 27, 2012, pp. 1340-1351.

Machanavajhala, et al., "L-Diversity: Privacy Beyond k-Anonymity", In Proceedings of ACM Transactions on Knowledge Discovery from Data, vol. 1, Issue 1, Mar. 1, 2007, 52 Pages.

Murtagh, et al., "The Complexity of Computing the Optimal Composition of Differential Privacy", In Theory of Cryptography Conference, Jan. 10, 2016, pp. 157-175.

Roch, Sebastien, "Notes 20: Azuma's Inequality", Retrieved From: https://web.archive.org/web/20220121052209/https://people.math.wisc.edu/~roch/grad-prob/gradprob-notes20.pdf, Jan. 21, 2022, 11 Pages.

Wang, et al., "Using randomized reponse for differential provacy preserving data collection", In Proceedings of the Workshops of the EDBT/ICT Joint Conference, Mar. 15, 2016, 8 Pages.

Warner, Stanleyl., "Randomized response: A survey technique for eliminating evasive answer bias", In Journal of the American Statistical Association, vol. 60, No. 309, Mar. 1965, 8 Pages.

Zeng, et al., "On Differentially Private Frequent Itemset Mining", In Proceedings of the VLDM Endowment, vol. 6, Issue 1, Nov. 1, 2012, pp. 25-36.

Zhu, et al., "Federated Heavy Hitters Discovery with Differential Privacy", In Repository of arXiv:1902.08534v1, Feb. 22, 2019, 17 Pages.

U.S. Appl. No. 17/978,933, filed Nov. 1, 2022.

* cited by examiner

Receive, from a network, a request that includes a user identifier and metadata associated with a slot available at a user system.
602

↓

Remove the user identifier from the request to produce anonymized request data.
604

↓

Send the anonymized request data to a machine learning model trained to determine relationships between labels and requests.
606

↓

Receive, from the machine learning model, superposition data that maps to the anonymized request data including the placement data, where the superposition data includes group labels and confidence scores, each confidence score is associated with one group label, and each confidence score is computed independently of the confidence scores computed for the other group labels.
608

↓

Send the superposition data to a real-time content-to-request matching process.
610

↓

Receive, from the real-time content-to-request matching process, an identifier that identifies a content distribution selected from a plurality of available content distributions based on the superposition data.
612

↓

Initiate the selected content distribution through the network to the slot in response to the request.
614

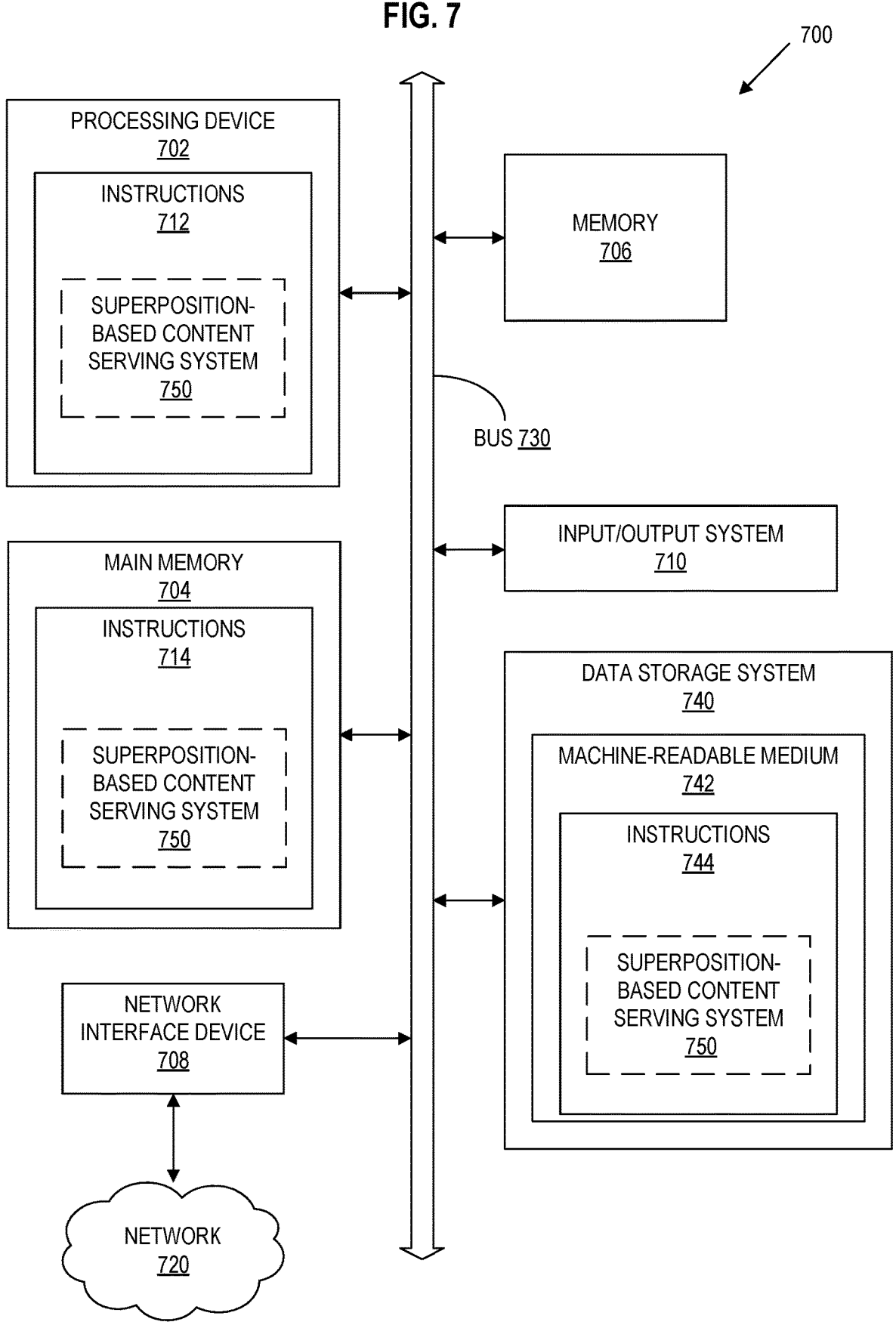

SUPERPOSITION-BASED CONTENT SERVING

TECHNICAL FIELD

A technical field to which the present disclosure relates is digital content distribution, including content serving systems. Another technical field to which the present disclosure relates is data security, including maintaining data security in automated content-to-request matching processes.

BACKGROUND

Software applications use computer networks to distribute digital content to user computing devices. On user devices, digital content can be displayed through slots of a graphical user interface. For example, news feeds and home pages contain slots. When a user logs in to or opens a software application, or traverses to a new page of an application, the application may generate one or more requests for content to be displayed in one or more of the available slots.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 is a flow diagram of an example method for superposition-based content serving in accordance with some embodiments of the present disclosure.

FIG. 7 is a block diagram of an example computer system in which embodiments of the present disclosure can operate.

DETAILED DESCRIPTION

Figure 1:
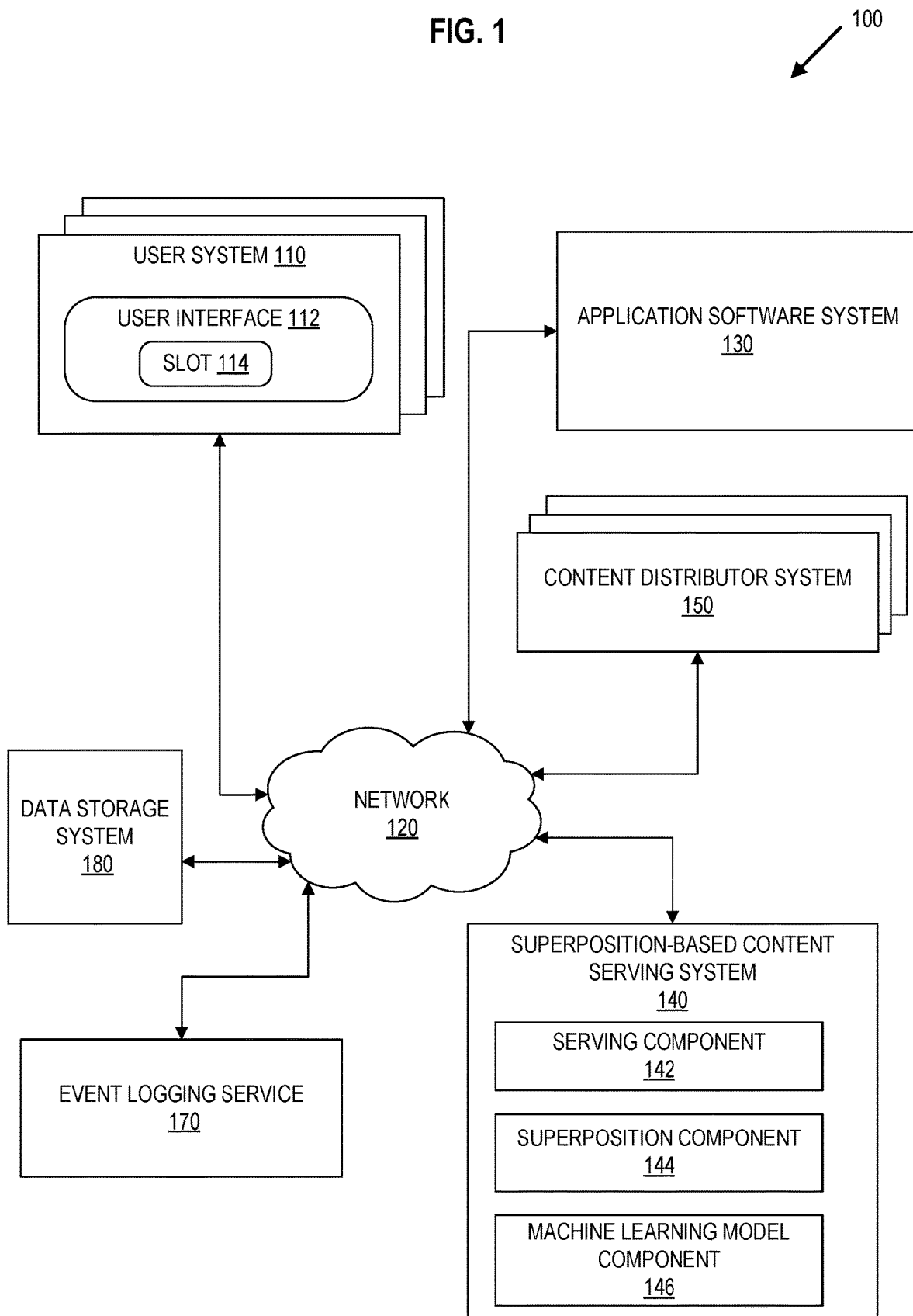
FIG. 1 illustrates an example computing system that includes a superposition-based content serving system in accordance with some embodiments of the present disclosure.

A content serving system distributes digital content to user devices through, for example, web sites, mobile apps, and VR/AR/MR (virtual reality, augmented reality, mixed reality) systems. A content serving system distributes content to different users through an online network based on, for example, rules, targeting criteria, and/or machine learning model output. Examples of content distributions include distributions of job postings, user-generated content, connection recommendations, news updates, e-commerce, entertainment, education and training materials, and advertisements.

A content serving system often includes or interacts with an automated content-to-request matching process, such as a real-time bidding (RTB) process. Automated content-to-request matching processes programmatically match digital content distributions to requests in real time. A request is, for example, a network message, such as an HTTP (HyperText Transfer Protocol) request for content, which is generated in connection with an online user interface event such as a click or a page load. The term click is used to refer to any type of action taken by a user with an input device or sensor, which causes a signal to be received and processed by the user's device, including mouse clicks, taps on touchscreen display elements, voice commands, gestures, haptic inputs, and/or other forms of user input.

The content serving system can log impressions, clicks, post-click and post-impression events, which the content serving system can use to compute performance metrics. Aspects of the present disclosure are directed to improving performance metrics for content serving systems. For example, aspects of the present disclosure are directed to improving system performance metrics for automated content-to-request matching processes while also providing adequate security for sensitive data.

Automated content-to-request matching processes can match hundreds of thousands or millions of content distributions to slots in a matter of seconds or milliseconds. An impression occurs when a content distribution is matched to a request and the content associated with the distribution is made available to the user through the slot associated with the request. An example of a system performance metric that can be used to measure the effectiveness of a digital content distribution is whether the content distribution achieves a minimum number of impressions in a certain amount of time. Another example of a system performance metric that can be used to measure the effectiveness of a digital content distribution is the number of impressions that occur on user devices that correspond to targeting criteria of the content distribution.

In some applications, content-to-request matching processes can match content directly with individual identifying information, such as user identifiers. Such direct matching may be appropriate if, for example, the individual identifying information is contained within a first-party application or on a user device that provides adequate data security, and the identifying information is not shared with other applications or devices.

In other applications, the content-to-request matching processes are separated from other components of the application software. For example, the content-to-request matching processes may be operated by a content distributor system or implemented as a network service. In these scenarios, the content-to-request matching processes need to be designed to accommodate security requirements associated with access-restricted data.

Given that the content-to-request matching processes are expected to perform hundreds of thousands or millions of matches of content distributions to requests in a matter of seconds or milliseconds, a technical challenge is to satisfy these and other performance metrics while also providing the required level of data security for access-restricted data such as individual user identifying information.

Figure 4:
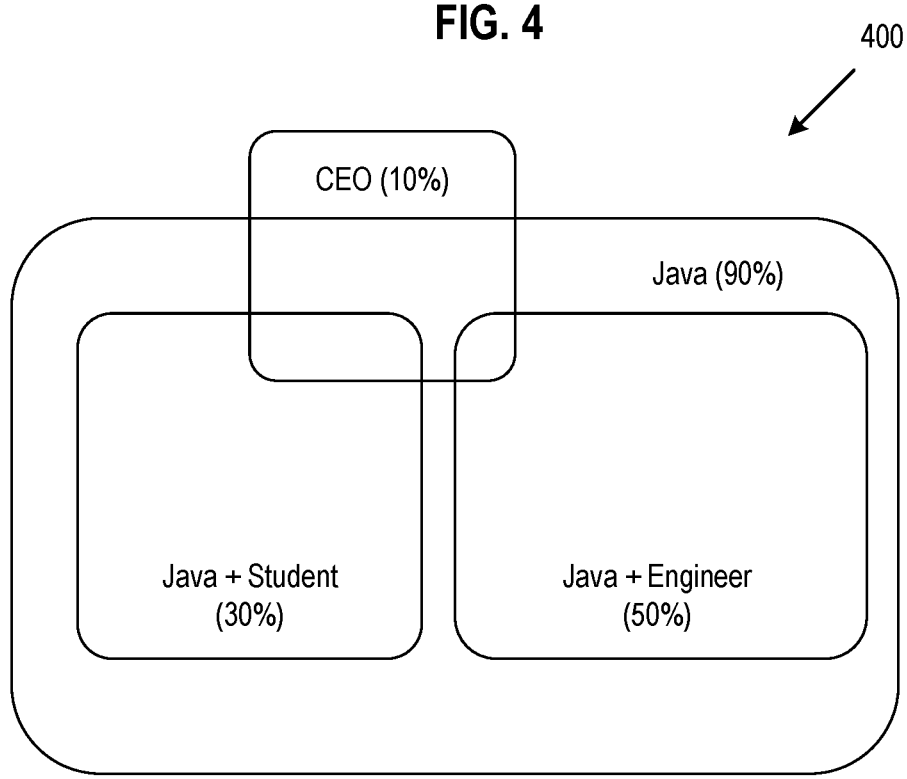
FIG. 4 is an example of superposition data in accordance with some embodiments of the present disclosure.

Aspects of the present disclosure address the above and other challenges by incorporating superposition data output by one or more machine learning models into one or more phases of the content-to-request matching process. FIG. 4 is an example of superposition data that may be generated by one or more machine learning models for a request. In the example, the superposition data includes a set of group labels, such as job titles, and a confidence score for each group label in the set of group labels.

Confidence score as used herein may refer to machine learning model output that indicates a statistical or probabilistic likelihood that a particular predictive output, such as a group label, of the machine learning model matches an actual, accurate, or ground-truth label. A confidence score can be an indicator of reliability of the predictive output of the machine learning model.

For example, if, for a particular request, a machine learning model outputs a group label of CEO and an associated confidence score of 10%, then, according to the machine learning model, there is a 90% chance that the user associated with the request is not a CEO. On the other hand, if, for the same request, the machine learning model outputs a group label of software engineer and an associated confidence score of 90%, then, according to the machine learning model, there is only a 10% chance that the user associated with the request is not a software engineer. In the illustrated examples, a higher confidence score corresponds to a higher reliability of the machine learning model's predictive output but other scoring mechanisms can be used in other implementations.

In FIG. 4, a graphic 400 is used to illustrate the overlapping nature of the superposition data. That is, the request can be associated with multiple different group labels at the same time with each group label having the same confidence score or a different confidence score, such that the sum of the confidence scores for all of the group labels correlated to the request does not need to add up to 1 or 100%.

When a request is received by an online system, metadata and/or attribute data associated with the request are correlated with a particular set of superposition data by a trained machine learning model, as described in more detail below. The machine learning model determines the superposition data (e.g., a set of job titles and associated confidence scores) associated with the request.

The confidence scores are computed independently for each of the multiple different group labels. There is no requirement that the sum of all of the confidence scores is 1, or 100%. This is because different group labels can have one or more elements in common. For instance, in FIG. 4, the superposition data correlated with a particular request includes three group labels that contain "Java." The group label Java has a confidence score of 90% with respect to the request, and the labels "Java+Student" and "Java+Engineer" have confidence scores of 30% and 50%, respectively, for the same request. The group label "CEO" has a confidence score of 10% for the request.

Different requests can have different superposition data. For example, superposition data for another request may have a confidence score of 90% for CEO and 10% for "Java+Engineer."

In some implementations, the group labels correspond directly to targeting criteria provided by content distributors. In other implementations, the group labels are obtained or derived from attribute data, event data, or combinations of attribute and event data associated with the user device at which a request is initiated.

Figure 5:
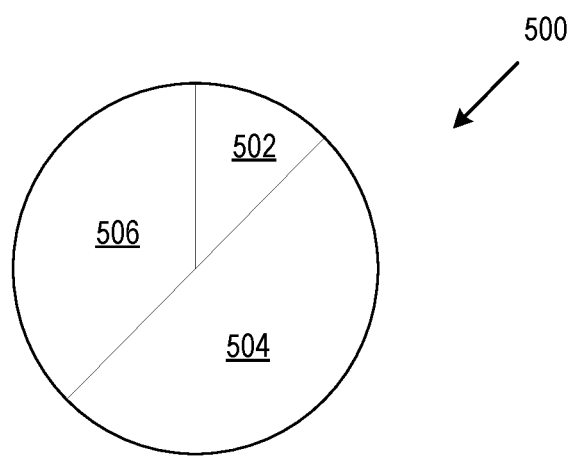
FIG. 5 is an example of a performance metric that may be associated with superposition-based content serving in accordance with some embodiments of the present disclosure.

FIG. 5 is an example of a performance metric that may be associated with superposition-based content serving in accordance with some embodiments of the present disclosure. In FIG. 5, a graphic 500 shows portions of an anonymized target audience of a content distributor that are reachable with superposition data and without superposition data. Taken together, portions 502, 504, 506 represent the entire available anonymized target audience. Portion 502 represents the portion that is reachable using traditional serving methods that do not use superposition-based serving. Thus, taken together, portions 504 and 506 represent the target audience that is not reachable by traditional serving methods.

Portion 506 represents the additional portion of the target audience that is reachable by superposition-based serving as described but is not reachable by traditional methods. For example, portion 506 represents lower-confidence traffic that would not be served by traditional methods but could be served using the disclosed approaches. Taken together, portions 502 and 506 represent the total portion of the target audience reachable using superposition serving. The sum of portions 502 and 506 is greater than the portion 502 taken alone. This difference represents an improvement provided by superposition-based serving as described over approaches that do not use superposition-based serving as described;

Additionally, other approaches map each request to only a single group label because they are based on the assumption that the label with the highest confidence score will produce the best content-to-request match. However, this is not always the case. For example, referring to FIG. 4, these other approaches would only return the label "Java" and not any of the other potentially applicable labels, because the "Java" label has the highest confidence score. As such, these other approaches are unable to map the request to a more precise group label, such as "Java+Student" or "Java+Engineer," which could result in a more relevant or better targeted content distribution to the user. Thus, compared with the traditional single group approaches, the disclosed approaches can make more group labels available for potential content serving, thereby providing opportunities for more precise or better targeted content-to-request matching. As a result, using the disclosed approaches, the content serving system's ability to match relevant content to requests is improved.

In these and other ways, aspects of the disclosed approaches improve the routing of content to high confidence group labels, and also enable lower confidence group labels to be served in certain configurable situations, such as when a content distribution is occurring more slowly than expected.

Aspects of the present disclosure address the above and other challenges by anonymizing requests, generating superposition data for the requests that have been anonymized and incorporating the superposition data into one or more phases of the content-to-request matching process. The superposition data is generated by a machine learning model that has been trained to determine relationships between semantic labels, such as group labels, and requests.

The superposition data produced by the machine learning model includes, for each request, a set of group labels and associated confidence scores. Each confidence score is associated with one group label, and each confidence score is computed independently of the confidence scores computed for the other group labels in the set. Examples of group labels include entity attributes, such as job title, company name, industry name, or geographic region. As described in more detail below, the content-to-request matching process uses the superposition data to select a content distribution to be matched to the anonymized request. The selected content distribution is distributed through the network to a slot associated with the request.

The disclosed technologies are described in the context of online network-based digital content distribution systems. A content distribution as used herein may contain one or more digital content items and one or more distribution parameters. Examples of distribution parameters include targeting criteria, pacing thresholds, and serving criteria. An example of a targeting criterion is an attribute value, such as a job title. An example of a pacing threshold is a data value that determines whether a particular request will be served, i.e., matched with a content distribution, by the content-to-request matching process. For instance, a higher pacing threshold could result in fewer requests being served in a given time period, thereby slowing pace of content delivery for a content distribution, and a lower pacing threshold may increase the number of requests served, thereby speeding up the pace of content delivery. An example of a serving criterion is a data value that quantifies a content distributor's priority level for the content distribution relative to other content distributions. For instance, a higher value of the serving criterion may increase the priority of the content distribution relative to other available content distributions, and a lower value of the serving criterion may decrease the priority of the content distribution relative to the other available content distributions. From the standpoint of the content serving system, a value of the serving criterion quantifies the value of the request relative to other requests.

Any network-based application software system can act as a content distribution system. For example, news and entertainment apps installed on mobile devices, messaging systems, job search systems, recruiter search systems, and social graph-based applications can all function as content distribution systems. An example of a content distribution use case is audience targeting for the distribution of advertisements for products and/or services over a social network.

Aspects of the disclosed technologies are not limited to ads targeting, or to social network applications, but can be used to improve digital content distribution systems more generally. For example, the disclosed technologies are not limited to use in connection with social graph applications. The disclosed technologies can be employed by many different types of network-based applications in which content distribution is provided, including but not limited to the various types and forms of application software systems mentioned above.

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates an example computing system that includes a superposition-based content serving system in accordance with some embodiments of the present disclosure.

In the embodiment of FIG. 1, computing system 100 includes one or more user systems 110, a network 120, an application software system 130, a superposition-based content serving system 140, one or more content distributor systems 150, an event logging service 170, and a data storage system 180.

As described in more detail below, application software system 130 and/or content distributor system 150 interfaces with superposition-based content serving system 140. Superposition-based content serving system 140 uses superposition data to match content distributions to slots 114 associated with requests issued by user systems 110. The content distribution requests include request metadata, including an identifier (ID) that may uniquely identify the source of the request (e.g., a user account identifier, a device identifier, a session identifier, etc.).

Superposition-based content serving system 140 includes a serving component 142, a superposition component 144, and a machine learning model component 146. Serving component 142 interfaces with application software system 130 and content distributor systems 150 to perform real-time matching of content distributions to requests using superposition data. Superposition component 144 interfaces with serving component 142 and machine learning model component 146 to provide the superposition data to serving component 102. Machine learning model component 146 includes a machine learning model that has been trained to determine relationships between requests and semantic labels such as group labels.

In some embodiments, superposition-based content serving system 140 is a component of application software system 130. In other embodiments, superposition-based content serving system 140 is a separate component of computing system 100. For example, superposition-based content serving system 140 can be implemented as a network service that is called by application software system 130.

User system 110 includes at least one computing device, such as a personal computing device, a server, a mobile computing device, or a smart appliance. User system 110 includes at least one software application, including a user interface 112, installed on or accessible by a network to a computing device. In some embodiments, user interface 112 is or includes a front-end portion of application software system 130 and/or a front-end portion of content distributor system 150. For example, embodiments of user interface 112 include a graphical display screen that includes one or more slots 114. A slot as used herein refers to a space on a graphical display such as a web page or mobile device screen, into which digital content may be loaded during a content distribution. The locations and dimensions of a particular slot on a screen are specified using, for example, a markup language such as HTML (Hypertext Markup Language). On a typical display screen, a slot is defined by two-dimensional coordinates; however, in a virtual reality, augmented reality, mixed reality, or robotic implementation, a slot may be defined using a three-dimensional coordinate system. In a multimedia system, a slot can refer to a particular video or audio segment, which may be defined by a time interval.

User interface 112 is any type of user interface as described above. User interface 112 can be used to input search queries and view or otherwise perceive output that includes data produced by application software system 130 or content distributor system 150. For example, user interface 112 can include a graphical user interface and/or a conversational voice/speech interface that includes mechanisms for scrolling and interacting with a news feed, entering a search query, and viewing query results and/or other digital content. Examples of user interface 112 include web browsers, command line interfaces, and mobile apps. User interface 112 as used herein can include application programming interfaces (APIs).

Application software system 130 is any type of application software system that provides or enables at least one form of digital content distribution to user systems such as user system 110. Examples of application software system 130 include but are not limited to connections network software, such as social media platforms, and systems that are or are not based on connections network software, such as general-purpose search engines, job search software, recruiter search software, sales assistance software, content distribution software, learning and education software, or any combination of any of the foregoing.

Content distributor system 150 is any type of application software system that provides digital content items for distribution to user systems through application software system 130. Examples of content distributor system 150 include but are not limited to any type of networked software application that generates or distributes content.

Content generated or distributed by content distributor system 150 can include organic content and/or sponsored content. Organic content as used herein refers to digital content items that users do not pay to have distributed by an application software system. Organic content includes, for example, the free content that users share with each other on social media platforms. Sponsored content as used herein refers to digital content items that entities pay to have distributed among users of the application software system. Sponsored content includes, for example, digital advertising. Digital content item as used herein includes text, video, graphics, audio, digital imagery, or any combination of any of the foregoing.

Event logging service 170 captures user interface events such as page loads and clicks in real time, and formulates the user interface events into a data stream that can be consumed by, for example, a stream processing system. For example, when a user of application software system 130 or content distributor system 150 logs in to the system, opens the app, traverses to a new page of the app, clicks on a user interface control such as view, comment, share, like, loads a web page, or scrolls through a feed, etc., event logging service 170 fires an event to capture an identifier, an event type, a date/timestamp at which the user interface event occurred, and possibly other information about the user interface event, such as the impression portal and/or the impression channel involved in the user interface event (e.g., device type, operating system, etc.). Event logging service 170 generates a data stream that includes one record of real-time event data for each user interface event that has occurred. Event logging service 170 captures user interface events on a per-session basis such that each session of each user of application software system 130 may generate an event stream that is captured by event logging service 170. As such, event logging service 170 can provide user interface event data for multiple users, devices, and sessions to other systems and services, such as superposition-based content serving system 140.

Time as used in the context of terminology such as real-time refers to a time delay introduced by the use of computer technology, e.g., by automated data processing and/or network transmission, where the time delay is the difference in time, as measured by a system clock, between the occurrence of an online event and the use of data processed in response to the event, such as for display, feedback, and/or control purposes. Real-time means, for example that the time delay between two events, or between an event and feedback, is not perceptible to the user or falls within a range of latency values that is acceptable to the user. For most users, a real-time latency value is in the range of milliseconds, or less than one second. For some users, a real-time latency value is up to about three seconds.

Data storage system 180 includes data stores and/or data services that store digital content items, data received, used, manipulated, and produced by application software system 130 and/or content distributor system 150. Alternatively or in addition, data storage system 180 includes data stores and/or data services that store data received, used, manipulated, and produced by superposition-based content serving system 140. In some embodiments, data storage system 180 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine.

Data stores of data storage system 180 can be configured to store data produced by real-time and/or offline (e.g., batch) data processing. A data store configured for real-time data processing can be referred to as a real-time data store. A data store configured for near real-time data processing can be referred to as a near real-time data store or nearline data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 180 resides on at least one persistent and/or volatile storage device that can reside within the same local network as at least one other device of computing system 100 and/or in a network that is remote relative to at least one other device of computing system 100. Thus, although depicted as being included in computing system 100, portions of data storage system 180 can be part of computing system 100 or accessed by computing system 100 over a network, such as network 120.

While not specifically shown, it should be understood that any of user system 110, network 120, application software system 130, superposition-based content serving system 140, content distributor system 150, event logging service 170, and data storage system 180 includes an interface embodied as computer programming code stored in computer memory that when executed causes a computing device to enable bidirectional communication with any other of user system 110, network 120, application software system 130, superposition-based content serving system 140, content distributor system 150, event logging service 170, and data storage system 180 using a communicative coupling mechanism. Examples of communicative coupling mechanisms include network interfaces, inter-process communication (IPC) interfaces and application program interfaces (APIs).

A client portion of application software system 130 and/or content distributor system 150 can operate in user system 110, for example as a plugin or widget in a graphical user interface of a software application or as a web browser executing user interface 112. In an embodiment, a web browser transmits an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes.

Each of user system 110, application software system 130, superposition-based content serving system 140, content distributor system 150, event logging service 170, and data storage system 180 is implemented using at least one computing device that is communicatively coupled to electronic communications network 120. Any of user system 110, application software system 130, superposition-based content serving system 140, content distributor system 150, event logging service 170, and data storage system 180 can be bidirectionally communicatively coupled by network 120. User system 110 as well as one or more different user systems (not shown) can be bidirectionally communicatively coupled to application software system 130 and/or content distributor system 150.

A typical user of user system 110 can be an administrator or end user of application software system 130, superposition-based content serving system 140, and/or content distributor system 150. User system 110 is configured to communicate bidirectionally with application software system 130, superposition-based content serving system 140, and/or content distributor system 150 over network 120.

The features and functionality of user system 110, application software system 130, superposition-based content serving system 140, content distributor system 150, event logging service 170, and data storage system 180 are implemented using computer software, hardware, or software and hardware, and can include combinations of automated functionality, data structures, and digital data, which are represented schematically in the figures. User system 110, application software system 130, superposition-based content serving system 140, content distributor system 150, event logging service 170, and data storage system 180 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Further details with regard to the operations of the superposition-based content serving system 140 are described below.

Figure 2:
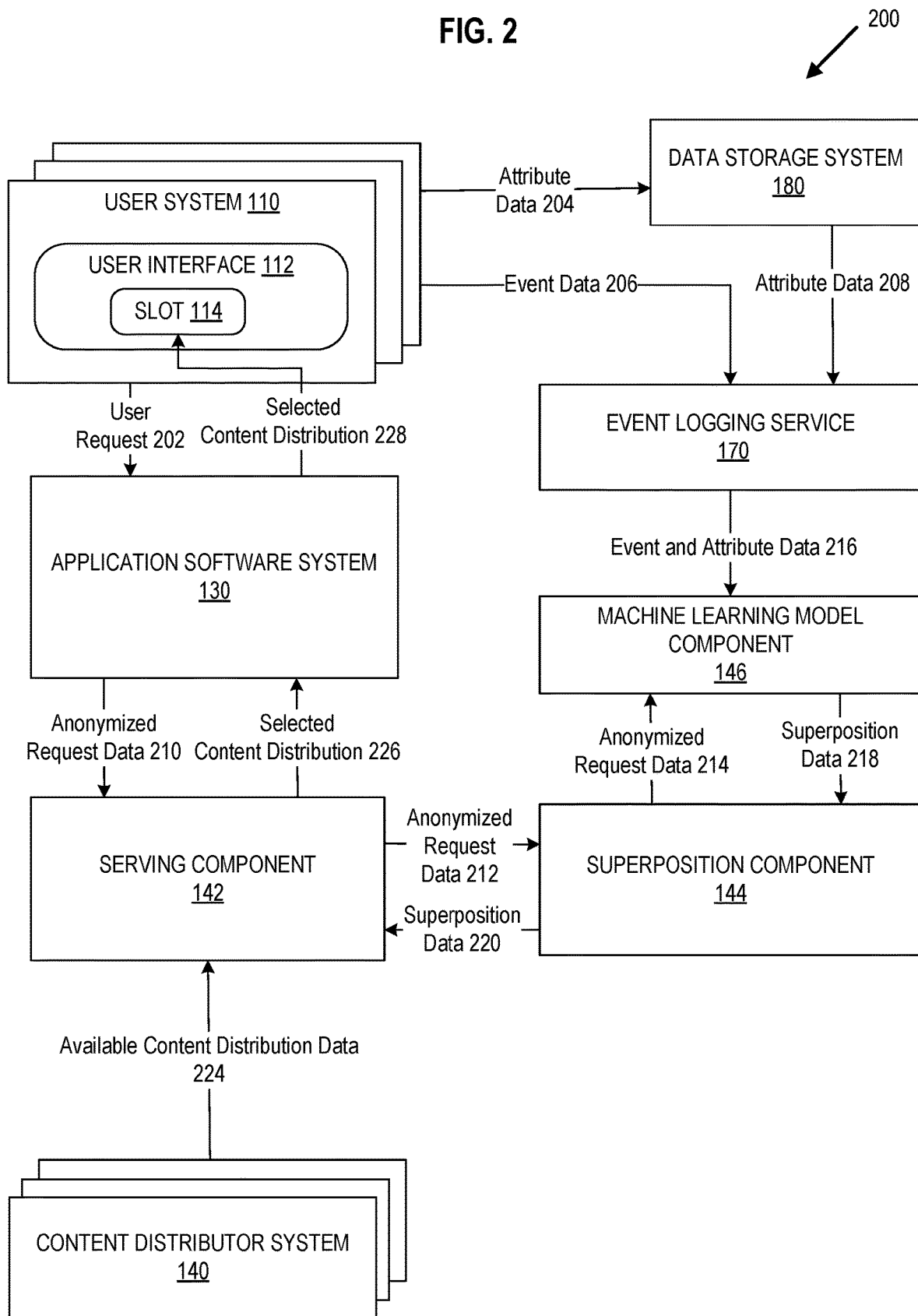
FIG. 2 is a flow diagram of an example method for superposition-based content serving in accordance with some embodiments of the present disclosure.

FIG. 2 is a flow diagram of an example method for superposition-based content serving in accordance with some embodiments of the present disclosure.

The method 200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the application software system 130 of FIG. 1 in cooperation with superposition-based content serving system 140. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, application software system 130 receives a user request 202 from a user system 116. User request 202 is, for example, a communication formulated using a protocol such as HTTP or an application program interface (API). User request 202 contains identifying information such as a user identifier, a network address, a session identifier, a device address, or any combination of any of the foregoing. User request 202 also contains slot metadata, i.e., information about a slot 114 that is available to receive content. The slot metadata includes, for example, placement data. Examples of placement data include the slot dimensions, e.g., length of the slot diagonal; slot position, e.g., on-screen x-y coordinates; and slot ranking data, e.g., a value of the slot relative to other available slots. The slot metadata also or alternatively includes, in some embodiments, device metadata such as the hardware manufacturer, operating system name and version, and identifying information for the calling application, e.g., an identifier for application software system 130. In some embodiments, the slot metadata includes context data associated with the slot, such as timestamp data, current and/or historical event data 206 and/or attribute data 204.

Portions of the slot metadata are passed to application software system 130 through user interface 112 or collected and stored by event logging service 170 and/or data storage system 180. For example, event data 206 associated with user request 202 is logged by event logging service 170, and attribute data 204 is stored in data storage system 180. Examples of event data 206 include user interface events associated with the user's current and/or historical login sessions with application software system 130. Examples of attribute data include data commonly associated with the user's online profile, such as name, title, biographical data such as job history, and connections. In some embodiments, event logging service 170 joins portions of attribute data 208 with certain event data 206.

Application software system 130 anonymizes the user request 202 to create anonymized request data 210. For example, application software system 130 removes user identifying information from user request 202 or masks the user identifying information. Anonymized request data 210 includes portions of user request 202 but does not include user identifying information. For instance, anonymized request data 210 includes a request identifier and the slot metadata.

Anonymized request data 210 is received from application software system 130 by serving component 142 of the superposition-based content serving system 140. Serving component 142 forwards the anonymized request data 210 to superposition component 144 as anonymized request data 212. Anonymized request data 212 may be the same as anonymized request data 210 or a processed version of anonymized request data 210. For example, serving component 142 may re-format anonymized request data 210 or add additional metadata to anonymized request data 210 to produce anonymized request data 212. In some embodiments, superposition component 144 and serving component 142 are combined such that serving component 142 does not need to send anonymized request data 212 to superposition component 144.

Superposition component 144 forwards the anonymized request data 212 to machine learning model component 146 as anonymized request data 214. Anonymized request data 214 may be the same as anonymized request data 212 or a processed version of anonymized request data 210. For example, superposition component 144 may re-format anonymized request data 212 or add additional metadata to anonymized request data 212 to produce anonymized request data 214. In some embodiments, superposition component 144 and machine learning model component 146 are combined such that superposition component 144 does not need to send anonymized request data 214 to machine learning model component 146.

Before sending anonymized request data 214 to machine learning model component 146, superposition component 144 performs pre-processing on the anonymized request data 212, in some embodiments. For example, superposition component 144 parses the anonymized request data 212 into separate data elements and/or featurizes the anonymized request data 212. An example of featurizing the anonymized request data 212 includes converting portions of the anonymized request data 212 into one or more vector representations, embeddings and/or other inputs that can be read by machine learning model component 146. The particulars of the pre-processing that may be performed by superposition component 144 are determined based on the requirements or design of machine learning model component 146. Alternatively or in addition, portions of the pre-processing of the anonymized request data 214 may be performed by machine learning model component 146. For example, an input layer of a neural network of machine learning model component 146 receives anonymized request data 214 and generates one or more embeddings based on the anonymized request data 214, in some embodiments.

Machine learning model component 146 includes one or more machine learning models that are trained to determine relationships between semantic labels and request data. For example, given one or more inputs that include or are representations of anonymized request data 214, machine learning model component 146 outputs superposition data 218 that is semantically related to the anonymized request data 214. In some embodiments, machine learning model component 146 joins the anonymized request data 214 with associated event and attribute data 216, where the join is based on a common request identifier, for example. In those embodiments, machine learning model component 146 creates input features using the joined anonymized request data, event data, and attribute data and determines the superposition data 218 based on one or more combinations of those input features.

The one or more machine learning models of machine learning model component 146 are trained by, for example, applying a supervised machine learning technique to training data that includes training examples of request data and ground-truth semantic labels. A training example used to train the one or more machine learning models includes, for instance, historical event and attribute data 216. The one or more machine learning models are applied to the training examples. The predictive output of the one or more machine learning models is observed for requests 202 iteratively until a set of model validation criteria are satisfied. The model validation criteria are used to determine when the one or more machine learning models have converged so as to provide values of superposition data 218 that can be relied upon with some degree of certainty. The requisite level of certainty and the validation criteria are determined based on the requirements or design of a particular implementation of the one or more machine learning models.

An example of training data used to train the one or more machine learning models in some implementations includes a set of features and a ground truth label, where the set of features includes or is derived from historical user attribute and/or event data, but does not include the user's individual identity. For example, a training example could contain a ground-truth label of Java if most of the articles clicked on by the user relate to Java. Another training example generated for the same user could contain a ground-truth label of CEO if the user's profile data includes a job title of CEO. The anonymized individual training examples are grouped by similarity to a group label using K-anonymity to ensure that the number of examples in each group is large enough to ensure that anonymity is maintained.

Alternatively or in addition, an unsupervised machine learning approach is used to cluster labeled or unlabeled training examples based on similar features. For instance, if training examples include historical attribute and/or event data that contain only English-language content, the clustering algorithm may cluster these examples into an English speaker group. The group size is measured and monitored to make sure that it is large enough (e.g., greater than or equal to K) to ensure that users remain anonymous. When the group size achieves K-anonymity, then the group label is available for use in superposition data.

To train a model, in some implementations, labeled training examples are clustered and grouped into multiple different groups, where the group could overlap to present different kinds of attributions (e.g., the same training example can belong to multiple different groups).

After clustering, features are extracted and classification is performed on the extracted features. For example, the machine learning algorithm automatically assigns a higher weight to certain features that are strong predictors of a particular outcome (for example, event data that includes browsing an English website is a strong feature to indicate that the training example is for an English speaker). A training example could also belong to multiple groups at the same time (for example, a person could speak both English and Spanish). In this case, the model would be trained with both examples. In the prediction phase, the machine learning model computes and outputs a confidence score associated with each matching label.

Multi-group triangulation can occur when the group size is reduced to less than K when measured across multiple different groups. To reduce the risk of multi-group triangulation, another anonymization algorithm such as L-anonymity or t-closeness is used to ensure that each group remains K-anonymous regardless of the number of groups that are generated. The value of K is configurable and determined based on the requirements of a particular design or implementation. Each of the one or more machine learning models has an associated neural network-based model architecture implemented using one or more objective functions. In some embodiments, a single, multi-task transformer-based machine learning model is used to generate the set of labels and associated confidence scores. In other embodiments, multiple different machine learning models are used, with each model being, for example, a linear regression or logistic regression-based model trained to output a confidence score for a different label.

Machine learning model component 146 generates superposition data 218 in response to the anonymized request data 214. An example of superposition data 218 is shown in FIG. 4, described above. Superposition component 144 receives superposition data 218 from machine learning model component 146 and sends superposition data 220 to serving component 142 in response to anonymized request data 212. Superposition data 220 may be the same as superposition data 218 or a processed version of superposition data 218. For example, if machine learning model component is implemented as a set or ensemble of multiple different models, superposition component 144 may combine the output of the multiple different models to produce superposition data 220.

Serving component 142 receives available content distribution data 224 from one or more content distributor systems 150. Available content distribution data 224 includes, for each content distribution that is available to be served, distribution parameters such as targeting criteria, pacing threshold, and serving criteria. These distribution parameters are obtained from the one or more content distributor systems 150 along with other available content distribution data 224 or through other processes. Serving component 142 receives superposition data 220 from superposition component 144. Based on superposition data 220 and available content distribution data 224, superposition component 144 selects a content distribution 226 from a set of multiple available content distributions identified by the available content distribution data 224. Serving component 142 sends the selected content distribution 226 to application software system 130.

Application software system 130 sends selected content distribution 226 to slot 114 as selected content distribution 228. Selected content distribution 228 may be the same as selected content distribution 226 or a processed version of selected content distribution 226. For example, application software system 130 may re-format selected content distribution 226 or add additional metadata to selected content distribution 226 to produce selected content distribution 228. User interface 112 displays selected content distribution 228 in slot 114 in response to user request 202. The time delay between the issuance of user request 202 by user system 110 and the display of selected content distribution 228 in slot 114 is expected to be milliseconds, i.e., less than a second.

Figure 3:
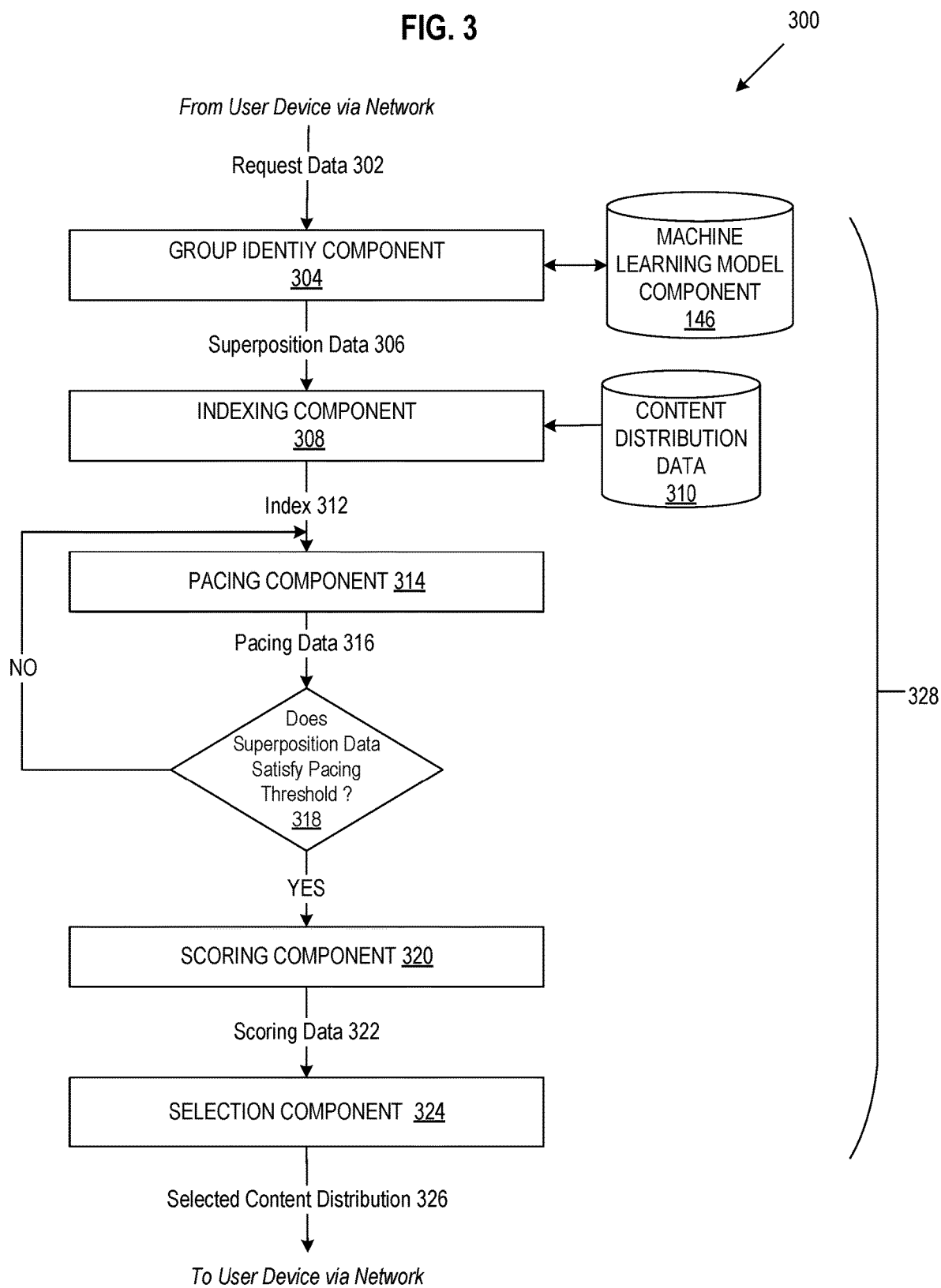
FIG. 3 is a flow diagram of an example method for superposition-based content serving, in accordance with some embodiments of the present disclosure.

FIG. 3 is a flow diagram of an example method for superposition-based content serving, in accordance with some embodiments of the present disclosure.

Portions of the method 300 are performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the superposition-based content serving system 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In FIG. 3, the method 300 includes a real-time content-to-request matching process 328. The content-to-request matching process 328 is referred to as real-time to distinguish it from offline matching processes. In the described examples, however, the entire workflow beginning with the receipt of request data to the selection of a content distribution occurs in real time.

Portions of the real-time content-to-request matching process 328 are performed by various components of superposition-based content serving system 140, including a group identity component 304, an indexing component 308, a pacing component 314, a scoring component 320, and a selection component 324. In some implementations, group identity component 304 is part of superposition component 144, and indexing component 308, pacing component 314, scoring component 320, and selection component 324 are part of serving component 142.

Request data 302 is generated at a user device and received by group identity component 304 through a communications network such as the Internet or a sub-network of the Internet. Request data 302 may be anonymized before being received by group identity component 304 or at group identity component 304. Group identity component 304 sends request data 302 to machine learning model component 136. Machine learning model component 136 determines superposition data that corresponds to the request data 302 and outputs and sends the superposition data to group identity component 304.

Group identity component 304 passes superposition data 306 to indexing component 308. Indexing component 308 creates an index 312 by mapping superposition data 306 to content distribution data 310. Content distribution data 310 is, for example, a subset of available content distribution data 224. Content distribution data 310 is stored in a local data store such as a cache, in some implementations.

An example to illustrate the operations of indexing component 308 is shown in Table 1 below.

TABLE 1

Example of Inputs to Indexing Component.

| Group Label | Confidence Score | Content Distribution ID | Targeting Criteria |
| --- | --- | --- | --- |
| CEO | 10% | C5 | CEO |
| Java | 90% | C1 | Java |
| Java + Engineer | 50% | C1, C4 | Engineer and Java |
| Java + Student | 30% | C1, C2, C3 | Student and Java |

In Table 1, the first two columns, group label and confidence score, are the superposition data associated with a particular request, as determined by machine learning model component 136. For instance, the superposition data for any request contains multiple different group labels and a confidence score associated with each group label. The second two columns, content distribution identifier (ID) and targeting criteria are the content distribution data obtained from content distribution data 310. Indexing component 308 uses the group label data to match content distributions with the request. In this example, indexing component 308 has identified five content distributions (C1, C2, C3, C4, C5) that are available to potentially match to the request because those content distributions match one or more of the group labels that have been associated with the request by group identity component 304. Indexing component 308 generates an index that maps the confidence scores to the content distributions that match the group labels associated with the confidence scores. By mapping the confidence scores directly to the content distributions, the index facilitates a quick estimation of the likelihood of success of each of the available content distributions with respect to the request. For instance, for a content distribution with a higher confidence score, there may be a greater chance of a click or a conversion resulting from providing that content distribution in response to the request. An example to illustrate index 312 is shown in Table 2 below.

TABLE 2

Example Index.

| Confidence Score | Content Distribution ID |
|---|---|
| 10% | C5 |
| 90% | C1 |
| 50% | C1, C4 |
| 30% | C1, C2, C3 |

As shown in Table 2, content distribution C1 is mapped to three different confidence scores as a result of C1's targeting criteria matching three of the group labels associated with the request. For example, as shown in Table 1, C1's targeting criteria is "Java" and "Java" is found in three of the group labels (Java, Java+Student, and Java+Engineer). This is because C1's targeting criteria is defined more broadly than, for example, the targeting criteria for C2, C3, and C4. As another example, content distribution C4 is only mapped to one confidence score because, as shown in Table 1, C4's targeting criteria is "Engineer and Java," which only matches one of the group labels (Java+Engineer). The illustrated example shows confidence scores as percentage values, but the confidence scores can be implemented using any suitable numerical representation such as integers, fractions, or decimal values.

Indexing component 308 passes index 312 to pacing component 314. Pacing component 314 determines a pacing threshold associated with each of the available content distributions represented in index 312. Pacing component 314 uses index 312 to determine whether confidence scores associated with the available content distributions satisfy the associated pacing threshold. A confidence score satisfies a pacing threshold if, for example, the confidence score meets or exceeds the pacing threshold. If a confidence score does not satisfy the applicable pacing threshold, the associated content distribution is dropped from the content-to-request matching process; i.e., the content-to-request matching process is discontinued for that content distribution, at operation 318.

In other words, if a content distribution has an associated confidence score that does not satisfy the content distribution's pacing threshold, the content distribution will no longer be considered available to be assigned to the slot associated with the request data 302. After a content distribution is dropped, operation 318 continues to evaluate whether to drop or keep each of the other available content distributions. If a confidence score satisfies the applicable pacing threshold, the associated content distribution is not dropped from the content-to-request matching process; i.e., the content distribution continues to be included in the content-to-request matching process.

An example to illustrate the operation of pacing component 314 is shown in Table 3 below.

TABLE 3

Example of Superposition-Based Pacing.

| Content Distribution ID | Confidence Score (repeated from Table 2) (shown here in decimal form) | Pacing Threshold | Dropped? |
|---|---|---|---|
| C1 | 0.9 | 0.7 | No |
| C2 | 0.3 | 0.5 | Yes |
| C3 | 0.3 | 0.2 | No |
| C4 | 0.5 | 0.3 | No |
| C5 | 0.1 | 0.05 | No |

In the example of Table 3, the content-to-request matching process for request 302 will continue for the available content distributions C1, C3, C4, and C5 because the confidence scores associated with content distributions C1, C3, C4, and C5 satisfy (e.g., are greater than or equal to) the respective pacing thresholds. However, with regard to the request 302, the content-to-request matching process will be discontinued for the available content distribution C2 because the associated confidence score does not satisfy the corresponding pacing threshold.

Pacing component 314 outputs pacing data 316. Pacing data 316 includes a subset of the available content distributions; i.e., only those content distributions for which the associated confidence score satisfies the applicable pacing threshold, and their associated superposition data. The subset of available content distributions having associated confidence scores that satisfy the applicable pacing thresholds are passed to scoring component 320.

Scoring component 320 determines, for each of the content distributions represented in pacing data 316, scoring data 322. Scoring data includes, for example, a value of a serving criterion. In some embodiments, scoring component 320 uses superposition data 306 to adjust the value of the serving criterion for each of the content distributions represented in pacing data 316. Examples of serving criteria for which scoring component 320 can determine a value based on superposition data 306 include bid price and performance metrics such as interaction predictions, e.g., predicted click through rate (pCTR). Scoring component 320 can adjust some or all of the different serving criteria (e.g., both bid price and pCTR can be adjusted) based on superposition data.

To determine the value of the serving criterion for a content distribution, scoring component applies the associated confidence score to a pre-determined value of the serving criterion associated with the content distribution. For example, pre-determined values of distribution parameters are associated with the content distributions and stored in content distribution data 310. Scoring component 320 uses the confidence score as a coefficient or an offset that adjusts the value of the serving criterion based on the confidence score. An example to illustrate the operation of scoring component 320 is shown in Table 4 below.

TABLE 4

Example of Scoring Data.

| Content Distribution ID | Initial Value of Serving Criterion | Superposition-Adjusted Value |
|---|---|---|
| C1 | 4 | 3.5 |
| C3 | 6 | 1.8 |
| C4 | 8 | 4 |
| C5 | 50 | 5 |

In Table 4, the initial values of a serving criterion (e.g., bid price or a performance metric such as interaction prediction) are adjusted based on the confidence scores associated with each content distribution that satisfies the pacing threshold as described above. In each case, since the confidence score is less than 100%, the initial value is decreased by an amount commensurate with the confidence score. Scoring component 320 includes the superposition-adjusted values in scoring data 322 and does not include the initial values in the scoring data 322.

Scoring component 320 passes scoring data 322 to selection component 324. For each of the available content distributions represented in pacing data 316, selection component 324 compares the superposition-adjusted value of the serving criterion associated with the content distribution to the corresponding values of the other available content distributions or to a threshold serving criterion. For example, the superposition-adjusted values of that serving criterion are sorted in descending order or compared pairwise. Based on this comparison of the superposition-adjusted values of the serving criterion across the available content distributions represented in pacing data 316, selection component 324 selects one of the available content distributions as the selected content distribution 326. For instance, in the example of Table 4 above, selection component 324 could select content distribution C5 because its associated superposition-adjusted value (5) is the highest of all of the available content distributions.

In the illustrated example, selection component 324 looks for the content distribution that has the highest superposition-adjusted value of the serving criterion, but other methods for selecting the selected content distribution 326 could be used. For example, in some implementations, selection component 324 could select the content distribution whose associated superposition-adjusted value is closest to a threshold value such as the mean or average of all of the superposition-adjusted values. If there is a tie, selection component 324 can use another serving criterion, such as interaction prediction, to break the tie. Selection component 324 initiates delivery of the selected content distribution 326 to the user device associated with request data 302 through the communications network.

FIG. 6 is a flow diagram of an example method for superposition-based content serving in accordance with some embodiments of the present disclosure.

The method 600 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the superposition-based content serving system 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 602, the processing device receives, from a network, a request that includes a user identifier and metadata associated with a slot available at a user system. The request is, for example a user request such as user request 202, described above with reference to FIG. 2 and can include request data, such as request data 302, described above with reference to FIG. 3.

At operation 604, the processing device removes the user identifier from the request to produce anonymized request data. In some implementations, anonymized request data is produced by application software system 130 and is, for example, anonymized request data 210, described above with reference to FIG. 2.

At operation 606, the processing device sends the anonymized request data to a machine learning model trained to determine relationships between labels and requests. In some implementations, the machine learning model is at least a portion of machine learning model component 146, described above with reference to FIG. 1, FIG. 2, and FIG. 3.

At operation 608, the processing device receives, from the machine learning model, superposition data that maps to the anonymized request data including the placement data, where the superposition data includes group labels and confidence scores, each confidence score is associated with one group label, and each confidence score is computed independently of the confidence scores computed for the other group labels. In some implementations, the superposition data includes superposition data 220, described above with reference to FIG. 2, or superposition data 306, described above with reference to FIG. 3. Another example of superposition data is shown in FIG. 4, described above.

At operation 610, the processing device sends the superposition data to a real-time content-to-request matching process. The content-to-request matching process is referred to as real-time to distinguish it from offline matching processes. In the described examples, however, the entire workflow beginning with the receipt of request data at operation 602 to the initiation of a selected content distribution at operation 614 occurs in real time.

In some implementations, the real-time content-to-request matching process includes serving component 142, superposition component 144, and machine learning model component 146, shown in FIG. 2, described above. In some implementations, the real-time content-to-request matching process includes group identity component 304, indexing component 308, pacing component 314, and scoring component 320, and selection component 324, shown in FIG. 3, described above.

In some implementations, as described in more detail above, the real-time content-to-request matching process includes generating an index that maps the superposition data to targeting criteria, where each targeting criterion of the targeting criteria is associated with at least one content distribution of a set of available content distributions, and using the index to select a content distribution. In some implementations, generating the index includes using different group labels to match the confidence scores with the targeting criteria.

In some implementations, as described in more detail above, the real-time content-to-request matching process includes determining a confidence score associated with a group label of the different group labels that maps to a targeting criterion of a content distribution of the available content distributions, determining that the confidence score satisfies a pacing threshold associated with the content distribution, based on the confidence score, determining a value of a serving criterion associated with the content distribution, determining that the value of the serving criterion associated with the content distribution meets or exceeds a threshold serving criterion, and selecting the content distribution as the selected content distribution.

In some implementations, as described in more detail above, the real-time content-to-request matching process includes determining a confidence score associated with a group label of the different group labels that maps to a targeting criterion of a content distribution of the available content distributions, determining that the confidence score does not satisfy a pacing threshold associated with the content distribution, and discontinuing the real-time content distribution process for the content distribution.

In some implementations, as described in more detail above, the real-time content-to-request matching process includes determining that a confidence score associated with a group label of the different group labels is lower than the confidence scores associated with the other group labels of the different group labels, based on the confidence score, adjusting a value of a serving criterion associated with a content distribution that has a targeting criterion that maps to the group label, determining that the adjusted value of the serving criterion meets or exceeds a threshold serving criterion, and selecting the content distribution as the selected content distribution.

In some implementations, as described in more detail above, the real-time content-to-request matching process includes generating a value of an interaction prediction for a group label of the different group labels, adjusting the value of the interaction prediction based on the confidence score associated with the group label, and selecting the selected content distribution based on the adjusted value of the interaction prediction.

In some implementations, as described in more detail above, the real-time content-to-request matching process includes adjusting values of a serving criterion associated with the available content distributions based on the superposition data, and based on the adjusted values of the serving criterion, selecting the selected content distribution.

In some implementations, as described in more detail above, the real-time content-to-request matching process includes selecting, as the selected content distribution, a content distribution of the available content distributions that maps to a group label that does not have the highest confidence score of the confidence scores.

In some implementations, as described in more detail above, the real-time content-to-request matching process includes determining that a performance metric associated with the selected content distribution does not satisfy a threshold, and applying the selected content distribution to a group label that has a lower confidence score. In some implementations, as described in more detail above, the group labels include multiple different job titles.

At operation 612, the processing device receives, from the real-time content-to-request matching process, an identifier that identifies a content distribution selected from a set of available content distributions based on the superposition data. At operation 614, the processing device initiates the selected content distribution through the network to the slot in response to the request.

FIG. 7 illustrates an example machine of a computer system 700 within which a set of instructions, for causing the machine to perform any one or more of the methodologies discussed herein, can be executed. In some embodiments, the computer system 700 can correspond to a component of a networked computer system (e.g., the computer system 100 of FIG. 1) that includes, is coupled to, or utilizes a machine to execute an operating system to perform operations corresponding to the application software system 130, including the superposition-based content serving system 140 of FIG. 1.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a memory 706 (e.g., flash memory, static random access memory (SRAM), etc.), an input/output system 710, and a data storage system 740, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 712 for performing the operations and steps discussed herein.

Instructions 712 include portions the application software system 130 when those portions of the first party system are being executed by processing device 702. Thus, similar to the description above, superposition-based content serving system 140 is shown in dashed lines as part of instructions 712 to illustrate that, at times, portions of superposition-based content serving system 140 are executed by processing device 702. For example, when at least some portion of superposition-based content serving system 140 is embodied in instructions to cause processing device 702 to perform the method(s) described above, some of those instructions can be read into processing device 702 (e.g., into an internal cache or other memory) from main memory 704 and/or data storage system 740. However, it is not required that all of the superposition-based content serving systems be included in instructions 712 at the same time and portions of the superposition-based content serving system are stored in one or more other components of computer system 700 at other times, e.g., when one or more portions of the superposition-based content serving system are not being executed by processing device 702.

The computer system 700 further includes a network interface device 708 to communicate over the network 720. Network interface device 708 provides a two-way data communication coupling to a network. For example, network interface device 708 can be an integrated-services digital network (ISDN) card, cable modem, satellite modem, or a modem to provide a data communication connection to a corresponding type of telephone line. As another example, network interface device 708 can be a local area network (LAN) card to provide a data communication connection to a compatible LAN. Wireless links can also be implemented. In any such implementation network interface device 708 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 700.

Computer system 700 can send messages and receive data, including program code, through the network(s) and network interface device 708. In the Internet example, a server can transmit a requested code for an application program through the Internet and network interface device 708. The received code can be executed by processing device 702 as it is received, and/or stored in data storage system 740, or other non-volatile storage for later execution.

The input/output system 710 includes an output device, such as a display, for example a liquid crystal display (LCD) or a touchscreen display, for displaying information to a computer user, or a speaker, a haptic device, or another form of output device. The input/output system 710 can include an input device, for example, alphanumeric keys and other keys configured for communicating information and command selections to processing device 702. An input device can, alternatively or in addition, include a cursor control, such as a mouse, a trackball, or cursor direction keys for communicating direction information and command selections to processing device 702 and for controlling cursor movement on a display. An input device can, alternatively or in addition, include a microphone, a sensor, or an array of sensors, for communicating sensed information to processing device 702. Sensed information can include voice commands, audio signals, geographic location information, and/ or digital imagery, for example.

The data storage system 740 includes a machine-readable storage medium 742 (also known as a computer-readable medium) on which is stored one or more sets of instructions 744 or software embodying any one or more of the methodologies or functions described herein. The instructions 744 can also reside, completely or at least partially, within the main memory 704 and/or within the processing device 702 during execution thereof by the computer system 700, the main memory 704 and the processing device 702 also constituting machine-readable storage media.

In one embodiment, the instructions 744 include instructions to implement functionality corresponding to a superposition-based content serving system (e.g., the superposition-based content serving system 140 of FIG. 1).

Dashed lines are used in FIG. 7 to indicate that it is not required that the superposition-based content serving system be embodied entirely in instructions 712, 714, and 744 at the same time. In one example, portions of the superposition-based content serving system are embodied in instructions 744, which are read into main memory 704 as instructions 714, and portions of instructions 714 are read into processing device 702 as instructions 712 for execution. In another example, some portions of the superposition-based content serving system are embodied in instructions 744 while other portions are embodied in instructions 714 and still other portions are embodied in instructions 712.

While the machine-readable storage medium 742 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out any of the computer-implemented methods 200, 300, 600 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

In an example 1, a method includes receiving, from a network, a request including a user identifier and metadata associated with a slot available at a user system; removing the user identifier from the request to produce anonymized request data; sending the anonymized request data to a machine learning model trained to determine relationships between labels and requests; receiving, from the machine learning model, superposition data that correlates with the anonymized request data including the metadata; the superposition data includes a plurality of different group labels and a plurality of confidence scores, each confidence score is associated with one group label of the plurality of different group labels, and each confidence score is computed independently of the confidence scores computed for the other group labels of the plurality of different group labels; sending the superposition data for the anonymized request data to a real-time content-to-request matching process; receive, from the real-time content-to-request matching process, an identifier that identifies a content distribution selected from a plurality of available content distributions based on the superposition data; and initiating the selected content distribution through the network to the slot in response to the request.

An example 2 includes the subject matter of example 1, where the real-time content-to-request matching process further includes: generating an index that maps the superposition data to targeting criteria; each targeting criterion is associated with at least one content distribution of the plurality of available content distributions; and using the index to select the content distribution. An example 3 includes the subject matter of example 2, where generating the index includes: using the plurality of different group labels to match the plurality of confidence scores with the targeting criteria. An example 4 includes the subject matter of any of examples 1-3, where the real-time content-to-request matching process further includes: determining a confidence score associated with a group label of the plurality of different group labels that maps to a targeting criterion of a content distribution of the plurality of available content distributions; determining that the confidence score satisfies a pacing threshold associated with the content distribution; and selecting the content distribution as the selected content distribution. An example 5 includes the subject matter of any of examples 1-4, where the real-time content-to-request matching process further includes: determining a confidence score associated with a group label of the plurality of different group labels that maps to a targeting criterion of a content distribution of the plurality of available content distributions; determining that the confidence score does not satisfy a pacing threshold associated with the content distribution; and discontinuing the real-time content-to-request matching process for the content distribution. An example 6 includes the subject matter of any of examples 1-5, where the real-time content-to-request matching process further includes: determining that a confidence score associated with a group label of the plurality of different group labels is lower than the confidence scores associated with the other group labels of the plurality of different group labels; based on the confidence score, adjusting a value of a serving criterion associated with a content distribution that has a targeting criterion that maps to the group label; determining that the adjusted value of the serving criterion meets or exceeds a threshold serving criterion; and selecting the content distribution as the selected content distribution. An example 7 includes the subject matter of any of examples 1-6, where the real-time content-to-request matching process further includes: generating a value of an interaction prediction for a group label of the plurality of different group labels; adjusting the value of the interaction prediction based on a confidence score associated with the group label; and selecting the selected content distribution based on the adjusted value of the interaction prediction. An example 8 includes the subject matter of any of examples 1-7, where the real-time content-to-request matching process includes: adjusting values of a serving criterion associated with the plurality of available content distributions based on the superposition data; and based on the adjusted values of the serving criterion, selecting the selected content distribution. An example 9 includes the subject matter of any of examples 1-8, where the real-time content-to-request matching process further includes: selecting, as the selected content distribution, a content distribution of the plurality of available content distributions that maps to a group label that does not have the highest confidence score of the plurality of confidence scores. An example 10 includes the subject matter of any of examples 1-9, where the real-time content-to-request matching process further includes: determining that a performance metric associated with the selected content distribution does not satisfy a threshold; and applying the selected content distribution to a group label that has a lower confidence score. An example 11 includes the subject matter of any of examples 1-10, where the plurality of different group labels includes a plurality of different job titles.

In an example 12, a system includes: at least one memory; and at least one processor coupled to the at least one memory; where the at least one memory includes instructions that, when executed by the at least one processor cause the at least one processor to perform operations including: receiving, from a network, a request including a user identifier and metadata associated with a slot available at a user system; removing the user identifier from the request to produce anonymized request data; sending the anonymized request data to a machine learning model trained to determine relationships between labels and requests; receiving, from the machine learning model, superposition data that correlates with the anonymized request data including the metadata; the superposition data includes a plurality of different group labels and a plurality of confidence scores, each confidence score is associated with one group label of the plurality of different group labels, and each confidence score is computed independently of the confidence scores computed for the other group labels of the plurality of different group labels; sending the superposition data for the anonymized request data to a real-time content-to-request matching process; receive, from the real-time content-to-request matching process, an identifier that identifies a content distribution selected from a plurality of available content distributions based on the superposition data; and initiating the selected content distribution through the network to the slot in response to the request.

An example 13 includes the subject matter of example 12, where the real-time content-to-request matching process further includes: generating an index that maps the superposition data to targeting criteria; each targeting criterion is associated with at least one content distribution of the plurality of available content distributions; and using the index to select the content distribution. An example 14 includes the subject matter of example 12 or example 13, where the real-time content-to-request matching process further includes: determining a confidence score associated with a group label of the plurality of different group labels that maps to a targeting criterion of a content distribution of the plurality of available content distributions; determining that the confidence score satisfies a pacing threshold associated with the content distribution; and selecting the content distribution as the selected content distribution. An example 15 includes the subject matter of any of examples 12-14, where the real-time content-to-request matching process further includes: determining a confidence score associated with a group label of the plurality of different group labels that maps to a targeting criterion of a content distribution of the plurality of available content distributions; determining that the confidence score does not satisfy a pacing threshold associated with the content distribution; and discontinuing the real-time content-to-request matching process for the content distribution. An example 16 includes the subject matter of any of examples 12-15, where the real-time content-to-request matching process further includes: determining that a confidence score associated with a group label of the plurality of different group labels is lower than the confidence scores associated with the other group labels of the plurality of different group labels; based on the confidence score, adjusting a value of a serving criterion associated with a content distribution that has a targeting criterion that maps to the group label; determining that the adjusted value of the serving criterion meets or exceeds a threshold serving criterion; and selecting the content distribution as the selected content distribution. An example 17 includes the subject matter of any of examples 12-16, where the real-time content-to-request matching process further includes: generating a value of an interaction prediction for a group label of the plurality of different group labels; adjusting the value of the interaction prediction based on the confidence score associated with the group label; and selecting the selected content distribution based on the adjusted value of the interaction prediction. An example 18 includes the subject matter of any of examples 12-17, where the real-time content-to-request matching process includes: adjusting values of a serving criterion associated with the plurality of available content distributions based on the superposition data; and based on the adjusted values of the serving criterion, selecting the selected content distribution. An example 19 includes the subject matter of any of examples 12-18, where the real-time content-to-request matching process further includes: selecting, as the selected content distribution, a content distribution of the plurality of available content distributions that maps to a group label that does not have the highest confidence score of the plurality of confidence scores. An example 20 includes the subject matter of any of examples 12-19, where the real-time content-to-request matching process further includes: determining that a performance metric associated with the selected content distribution does not satisfy a threshold; and applying the selected content distribution to a group label that has a lower confidence score.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

The invention claimed is:

1. A method comprising:
receiving, from a network, a request including a user identifier and metadata associated with a slot available at a user system;
removing the user identifier from the request to produce anonymized request data;
sending the anonymized request data to a machine learning model trained to determine relationships between labels and requests;
receiving, from the machine learning model, superposition data that correlates with the anonymized request data including the metadata;
the superposition data comprises a plurality of different group labels and a plurality of confidence scores, each confidence score is associated with one group label of the plurality of different group labels, and each confidence score is computed independently of the confidence scores computed for other group labels of the plurality of different group labels;
sending the superposition data for the anonymized request data to a real-time content-to-request matching process;
receiving, from the real-time content-to-request matching process, an identifier that identifies a content distribution selected from a plurality of available content distributions based on the superposition data; and
initiating the selected content distribution through the network to the slot in response to the request, wherein the real-time content-to-request matching process comprises determining that a performance metric associated with the selected content distribution does not satisfy a threshold and applying the selected content distribution to a group label that has a lower confidence score.

2. The method of claim 1, wherein the real-time content-to-request matching process further comprises:
generating an index that maps the superposition data to targeting criteria;
each targeting criterion is associated with at least one content distribution of the plurality of available content distributions; and
using the index to select the content distribution.

3. The method of claim 2, wherein generating the index comprises:
using the plurality of different group labels to match the plurality of confidence scores with the targeting criteria.

4. The method of claim 1, wherein the real-time content-to-request matching process further comprises:
determining a confidence score associated with a group label of the plurality of different group labels that maps to a targeting criterion of a content distribution of the plurality of available content distributions;
determining that the confidence score satisfies a pacing threshold associated with the content distribution; and
selecting the content distribution as the selected content distribution.

5. The method of claim 1, wherein the real-time content-to-request matching process further comprises:
generating a value of an interaction prediction for a group label of the plurality of different group labels;
adjusting the value of the interaction prediction based on a confidence score associated with the group label; and
selecting the selected content distribution based on the adjusted value of the interaction prediction.

6. The method of claim 1, wherein the real-time content-to-request matching process comprises:
adjusting values of a serving criterion associated with the plurality of available content distributions based on the superposition data; and
based on the adjusted values of the serving criterion, selecting the selected content distribution.

7. The method of claim 1, wherein the real-time content-to-request matching process further comprises:
selecting, as the selected content distribution, a content distribution of the plurality of available content distributions that maps to a group label that does not have a highest confidence score of the plurality of confidence scores.

8. The method of claim 1, wherein the plurality of different group labels comprises a plurality of different job titles.

9. A method comprising:
receiving, from a network, a request including a user identifier and metadata associated with a slot available at a user system;
removing the user identifier from the request to produce anonymized request data;
sending the anonymized request data to a machine learning model trained to determine relationships between labels and requests;
receiving, from the machine learning model, superposition data that correlates with the anonymized request data including the metadata;
the superposition data comprises a plurality of different group labels and a plurality of confidence scores, each confidence score is associated with one group label of the plurality of different group labels, and each confidence score is computed independently of the confidence scores computed for other group labels of the plurality of different group labels;
sending the superposition data for the anonymized request data to a real-time content-to-request matching process;
receiving, from the real-time content-to-request matching process, an identifier that identifies a content distribution selected from a plurality of available content distributions based on the superposition data; and
initiating the selected content distribution through the network to the slot in response to the request, wherein the real-time content-to-request matching process further comprises:
determining a confidence score associated with a group label of the plurality of different group labels that maps to a targeting criterion of a content distribution of the plurality of available content distributions;
determining that the confidence score does not satisfy a pacing threshold associated with the content distribution; and
discontinuing the real-time content-to-request matching process for the content distribution.

10. A method comprising:
receiving, from a network, a request including a user identifier and metadata associated with a slot available at a user system;
removing the user identifier from the request to produce anonymized request data;
sending the anonymized request data to a machine learning model trained to determine relationships between labels and requests;
receiving, from the machine learning model, superposition data that correlates with the anonymized request data including the metadata;
the superposition data comprises a plurality of different group labels and a plurality of confidence scores, each confidence score is associated with one group label of the plurality of different group labels, and each confidence score is computed independently of the confidence scores computed for other group labels of the plurality of different group labels;
sending the superposition data for the anonymized request data to a real-time content-to-request matching process;
receiving, from the real-time content-to-request matching process, an identifier that identifies a content distribution selected from a plurality of available content distributions based on the superposition data; and
initiating the selected content distribution through the network to the slot in response to the request, wherein the real-time content-to-request matching process further comprises:
determining that a first confidence score associated with a group label of the plurality of different group labels is lower than second confidence scores associated with the other group labels of the plurality of different group labels;
based on the first confidence score, adjusting a value of a serving criterion associated with a content distribution that has a targeting criterion that maps to the group label;
determining that the adjusted value of the serving criterion meets or exceeds a threshold serving criterion; and
selecting the content distribution as the selected content distribution.

11. A system comprising:
at least one memory; and
at least one processor coupled to the at least one memory;
wherein the at least one memory comprises instructions that, when executed by the at least one processor cause the at least one processor to perform operations comprising:
receiving, from a network, a request including a user identifier and metadata associated with a slot available at a user system;
removing the user identifier from the request to produce anonymized request data;
sending the anonymized request data to a machine learning model trained to determine relationships between labels and requests;
receiving, from the machine learning model, superposition data that correlates with the anonymized request data including the metadata;

the superposition data comprises a plurality of different group labels and a plurality of confidence scores, each confidence score is associated with one group label of the plurality of different group labels, and each confidence score is computed independently of the confidence scores computed for other group labels of the plurality of different group labels;

sending the superposition data for the anonymized request data to a real-time content-to-request matching process;

receiving, from the real-time content-to-request matching process, an identifier that identifies a content distribution selected from a plurality of available content distributions based on the superposition data; and initiating the selected content distribution through the network to the slot in response to the request, wherein the real-time content-to-request matching process comprises determining that a performance metric associated with the selected content distribution does not satisfy a threshold and applying the selected content distribution to a group label that has a lower confidence score.

12. The system of claim 11, wherein the real-time content-to-request matching process further comprises:
generating an index that maps the superposition data to targeting criteria;
each targeting criterion is associated with at least one content distribution of the plurality of available content distributions; and
using the index to select the content distribution.

13. The system of claim 11, wherein the real-time content-to-request matching process further comprises:
determining a first confidence score associated with a group label of the plurality of different group labels that maps to a targeting criterion of a content distribution of the plurality of available content distributions;
determining that the first confidence score satisfies a pacing threshold associated with the content distribution; and
selecting the content distribution as the selected content distribution.

14. The system of claim 11, wherein the real-time content-to-request matching process further comprises:
generating a value of an interaction prediction for a group label of the plurality of different group labels;
adjusting the value of the interaction prediction based on the confidence score associated with the group label; and
selecting the selected content distribution based on the adjusted value of the interaction prediction.

15. The system of claim 11, wherein the real-time content-to-request matching process comprises:
adjusting values of a serving criterion associated with the plurality of available content distributions based on the superposition data; and
based on the adjusted values of the serving criterion, selecting the selected content distribution.

16. The system of claim 11, wherein the real-time content-to-request matching process further comprises:
selecting, as the selected content distribution, a content distribution of the plurality of available content distributions that maps to a group label that does not have a highest confidence score of the plurality of confidence scores.

17. A system comprising:
at least one memory; and
at least one processor coupled to the at least one memory;
wherein the at least one memory comprises instructions that, when executed by the at least one processor cause the at least one processor to perform operations comprising:
receiving, from a network, a request including a user identifier and metadata associated with a slot available at a user system;
removing the user identifier from the request to produce anonymized request data;
sending the anonymized request data to a machine learning model trained to determine relationships between labels and requests;
receiving, from the machine learning model, superposition data that correlates with the anonymized request data including the metadata;
the superposition data comprises a plurality of different group labels and a plurality of confidence scores, each confidence score is associated with one group label of the plurality of different group labels, and each confidence score is computed independently of the confidence scores computed for other group labels of the plurality of different group labels;
sending the superposition data for the anonymized request data to a real-time content-to-request matching process;
receiving, from the real-time content-to-request matching process, an identifier that identifies a content distribution selected from a plurality of available content distributions based on the superposition data; and
initiating the selected content distribution through the network to the slot in response to the request, wherein the real-time content-to-request matching process further comprises:
determining a first confidence score associated with a group label of the plurality of different group labels that maps to a targeting criterion of a content distribution of the plurality of available content distributions;
determining that the first confidence score does not satisfy a pacing threshold associated with the content distribution; and
discontinuing the real-time content-to-request matching process for the content distribution.

18. A system comprising:
at least one memory; and
at least one processor coupled to the at least one memory;
wherein the at least one memory comprises instructions that, when executed by the at least one processor cause the at least one processor to perform operations comprising:
receiving, from a network, a request including a user identifier and metadata associated with a slot available at a user system;
removing the user identifier from the request to produce anonymized request data;
sending the anonymized request data to a machine learning model trained to determine relationships between labels and requests;
receiving, from the machine learning model, superposition data that correlates with the anonymized request data including the metadata;
the superposition data comprises a plurality of different group labels and a plurality of confidence scores, each confidence score is associated with one group label of the plurality of different group labels, and each confidence score is computed independently of the confidence scores computed for other group labels of the plurality of different group labels;

sending the superposition data for the anonymized request data to a real-time content-to-request matching process;

receiving, from the real-time content-to-request matching process, an identifier that identifies a content distribution selected from a plurality of available content distributions based on the superposition data; and initiating the selected content distribution through the network to the slot in response to the request, wherein the real-time content-to-request matching process further comprises:

determining that a first confidence score associated with a group label of the plurality of different group labels is lower than second confidence scores associated with the other group labels of the plurality of different group labels;

based on the first confidence score, adjusting a value of a serving criterion associated with a content distribution that has a targeting criterion that maps to the group label;

determining that the adjusted value of the serving criterion meets or exceeds a threshold serving criterion; and selecting the content distribution as the selected content distribution.

* * * * *